United States Patent
Erban et al.

(10) Patent No.: US 9,764,720 B2
(45) Date of Patent: Sep. 19, 2017

(54) METHOD FOR OPERATING AN ELECTRIC MOTOR FOR BRAKING A VEHICLE, AND CONTROL DEVICE FOR AN ELECTRIC MOTOR DESIGNED AT LEAST FOR BRAKING A VEHICLE

(71) Applicant: Robert Bosch GmbH, Stuttgart (DE)

(72) Inventors: Andreas Erban, Loechgau (DE); Jochen Feinauer, Neuenstein (DE); Bastian Richter, Stuttgart (DE); Michael Knoop, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/165,575

(22) Filed: May 26, 2016

(65) Prior Publication Data

US 2016/0355167 A1 Dec. 8, 2016

(30) Foreign Application Priority Data

Jun. 2, 2015 (DE) .......................... 10 2015 210 104

(51) Int. Cl.
*B60T 1/10* (2006.01)
*B60T 13/58* (2006.01)
*B60T 13/74* (2006.01)
*B60L 15/20* (2006.01)
(Continued)

(52) U.S. Cl.
CPC ............ *B60T 8/17616* (2013.01); *B60L 7/26* (2013.01); *B60L 15/2009* (2013.01); *B60T 1/10* (2013.01); *B60T 13/586* (2013.01); *B60T 13/748* (2013.01); *B60L 2240/12* (2013.01); *B60L 2240/423* (2013.01); *B60L 2240/465* (2013.01); *B60T 2270/602* (2013.01)

(58) Field of Classification Search
CPC ...... B60T 8/17616; B60T 1/10; B60T 13/586; B60T 13/748; B60L 15/2009; B60L 7/26
USPC .......................................................... 701/71
See application file for complete search history.

(56) References Cited

U.S. PATENT DOCUMENTS

2005/0218718 A1* 10/2005 Iwatsuki ............... B60T 8/1766
303/177
2009/0066273 A1* 3/2009 Dunn ........................ B60T 1/10
318/376
(Continued)

FOREIGN PATENT DOCUMENTS

DE 102011103936 12/2012

*Primary Examiner* — Yazan Soofi
(74) *Attorney, Agent, or Firm* — Norton Rose Fulbright US LLP; Gerard Messina

(57) ABSTRACT

A method for operating an electric motor for braking a vehicle, including controlling the electric motor in such a way that the vehicle is slowed or decelerated with the aid of a motor braking torque exerted by the controlled electric motor. The method includes ascertaining whether a requested setpoint speed change is in a predefined normal range, and if so, the electric motor is controlled in such a way that a load to be applied by the electric motor remains less than or equal to a nominal load capacity of the electric motor. If the requested setpoint speed change is outside the predefined normal range, the electric motor is controlled in such a way that the load to be applied by the electric motor exceeds the nominal load capacity of the electric motor, at least during a predefined overload operation time interval.

12 Claims, 3 Drawing Sheets

(51) Int. Cl.
*B60L 7/26* (2006.01)
*B60T 8/1761* (2006.01)

(56) References Cited

U.S. PATENT DOCUMENTS

| | | | | |
|---|---|---|---|---|
| 2010/0324766 | A1* | 12/2010 | Linda | B60T 8/172 |
| | | | | 701/22 |
| 2013/0331231 | A1* | 12/2013 | Redbrandt | B60W 10/02 |
| | | | | 477/181 |
| 2016/0257222 | A1* | 9/2016 | Nakagawa | B60L 15/2063 |

* cited by examiner

METHOD FOR OPERATING AN ELECTRIC MOTOR FOR BRAKING A VEHICLE, AND CONTROL DEVICE FOR AN ELECTRIC MOTOR DESIGNED AT LEAST FOR BRAKING A VEHICLE

CROSS REFERENCE

The present application claims the benefit under 35 U.S.C. §119 of German Patent Application No. DE 102015210104.5 filed on Jun. 2, 2015, which is expressly incorporated herein by reference in its entirety.

FIELD

The present invention relates to a method for operating an electric motor for braking a vehicle. Moreover, the present invention relates to a control device for an electric motor which is designed at least for braking a vehicle. Furthermore, the present invention relates to an electric motor which is designed at least for braking a vehicle, and a braking system for a vehicle.

BACKGROUND INFORMATION

FIG. 1 shows a coordinate system for explaining a conventional method for decelerating a motor vehicle. The conventional method for decelerating a motor vehicle is described in DE 10 2011 103 936 A1, for example.

In the coordinate system in FIG. 1, the abscissa is a time axis t (in seconds). The ordinate of the coordinate system in FIG. 1 depicts a wheel braking torque M (as the sum of both wheel braking torques of an axle) in newton meters.

A deceleration of the motor vehicle is requested at a point in time t=0. As a response to the braking request, a brake pressure buildup is begun in at least one wheel brake cylinder at a front axle of the motor vehicle. The brake pressure buildup in the at least one wheel brake cylinder of the front axle, up to a friction braking torque Mhyd effectuated by the at least one wheel brake cylinder of the front axle, is equal to the braking request, but requires a comparatively long time (approximately 700 ms). For this reason, beginning at a (communication-related) reaction time Δt0, an electric motor which is designed for decelerating the motor vehicle is also controlled in such a way that the electric motor (immediately) effectuates a motor braking torque Mm for decelerating the motor vehicle. In the conventional method for decelerating a motor vehicle, the electric motor is controlled in such a way that effectuated motor braking torque Mm remains less than or equal to a limiting motor braking torque Mm0, above which a load on the electric motor exceeds the nominal load capacity (nominal load).

Due to the joint use of the at least one wheel brake cylinder of the front axle and the electric motor which is designed for decelerating the motor vehicle, the aim is to be able to effectuate a total braking torque Mtotal (as the sum of friction braking torque Mhyd and motor braking torque Mm) which already exerts a braking effect on the motor vehicle immediately after reaction time Δt0 has elapsed. In particular, the aim is for a braking distance of the motor vehicle that is to be decelerated to be reducible with the aid of the method depicted in FIG. 1.

SUMMARY

The present invention provides a method for operating an electric motor for braking a vehicle, a control device for an electric motor which is designed at least for braking a vehicle, an electric motor which is designed at least for braking a vehicle, and a braking system for a vehicle.

The present invention allows a significantly shortened braking distance, compared to the related art, during slowing/deceleration of a vehicle (to a standstill). The shortening of the braking distance compared to the related art is achievable due to the fact that, with the aid of the present invention, an increased motor braking torque is effectuatable with the aid of the electric motor, in particular at the start of a slowing/deceleration of the motor vehicle. As described in greater detail below, it may also be ensured that, despite a temporary load on the electric motor above the nominal load capacity, overheating of the electric motor is prevented.

The present invention is based, among other things, on the finding that, although a periodic load on the electric motor above the nominal load capacity is harmful to the electric motor and possibly to other vehicle components, an exceedance of the nominal load capacity solely in situations in which the requested setpoint speed change is outside the predefined normal range is possible without damage occurring. Thus, the exceedance of the load on the motor may be utilized to effectuate a greater deceleration on the vehicle, at least during the overload operation time interval, with the aid of the electric motor (operated in the overload operation). The vehicle may thus be decelerated quickly and with a reduced braking distance, in particular in emergency braking situations.

In one advantageous specific embodiment of the method, if the requested setpoint speed change is outside the predefined normal range, the electric motor is controlled in such a way that the load to be applied by the electric motor exceeds the nominal load capacity of the electric motor during the predefined overload operation time interval of 750 ms maximum. The overload operation time interval may be set to be shorter than 500 ms, in particular shorter than 300 ms, and if desired, shorter than 200 ms, even shorter than 100 ms. An exceedance of the load on the electric motor above the nominal load capacity, even a significant exceedance to 1.5 times the nominal load capacity, for example, is briefly achievable during the numerical values for the overload operation time interval stated here, without damage to the electric motor or to some other vehicle component occurring in the meantime.

In another advantageous specific embodiment of the method, at least if the requested setpoint speed change is outside the predefined normal range, at least one estimated or ascertained variable concerning a friction braking torque instantaneously exerted by at least one wheel brake cylinder of a hydraulic braking system of the vehicle is also taken into account during the control of the electric motor. In one refinement of the method, this is particularly advantageous when, in addition to the electric motor, the at least one wheel brake cylinder is also used for slowing/decelerating the vehicle. The vehicle may be slowed/decelerated even more quickly by the total braking torque, made up of the motor braking torque of the electric motor and the friction braking torque exerted by the at least one wheel brake cylinder. In addition, the electric motor may be controlled in such a way that the load on the electric motor occurs above the nominal load capacity only until a friction braking torque of the at least one wheel brake cylinder which is sufficient for meeting the requested setpoint speed change may be expected. The electric motor may thus be operated above the nominal load capacity, in particular during a phase in which a sufficient brake pressure is initially built up in the at least one wheel brake cylinder, while the electric motor experiences at most a load within the nominal load capacity as soon as the desired brake pressure is built up in the at least one wheel brake cylinder and a sufficient friction braking torque is available. In particular, the electric motor may be deactivated beginning when the friction braking torque is sufficient, so that the at least one wheel brake cylinder takes over the further deceleration of the vehicle.

If the requested setpoint speed change is outside the predefined normal range, the load to be applied by the electric motor is preferably controlled above the nominal load capacity of the electric motor only until the estimated or ascertained variable exceeds a predefined or set limiting value, and/or a wheel slip is detected. The limiting value may in particular be predefined or set in such a way that it corresponds to a limiting brake pressure or a limiting friction braking torque above which a wheel slip is likely. By terminating the operation of the electric motor in the overload operation beginning with an exceedance of the limiting value by the estimated or ascertained variable, or beginning with a detection of a wheel slip, an ABS operation of a hydraulic braking system equipped with the at least one wheel brake cylinder may thus be additionally assisted.

The limiting value is advantageously set taking an instantaneous speed of the vehicle, an instantaneous longitudinal acceleration of the vehicle, and/or an instantaneous transverse acceleration of the vehicle into account. All of the variables listed here may influence the likelihood of occurrence of a wheel slip. By taking into account at least one of these variables in setting the limiting value, a reduction in a torque of the electric motor may take place without interfering with an ABS wheel control.

The advantages described above are also achieved with a corresponding control device for an electric motor which is designed at least for braking a vehicle. An electric motor which is designed at least for braking a vehicle, and a braking system for a vehicle, each including such a control device, likewise provide the advantages described above. In all cases, the control device according to the above-described specific embodiments of the method for operating an electric motor for braking a vehicle may be refined.

BRIEF DESCRIPTION OF THE DRAWINGS

Further features and advantages of the present invention are explained below with reference to the figures.

DETAILED DESCRIPTION OF EXAMPLE EMBODIMENTS

Figure 2:
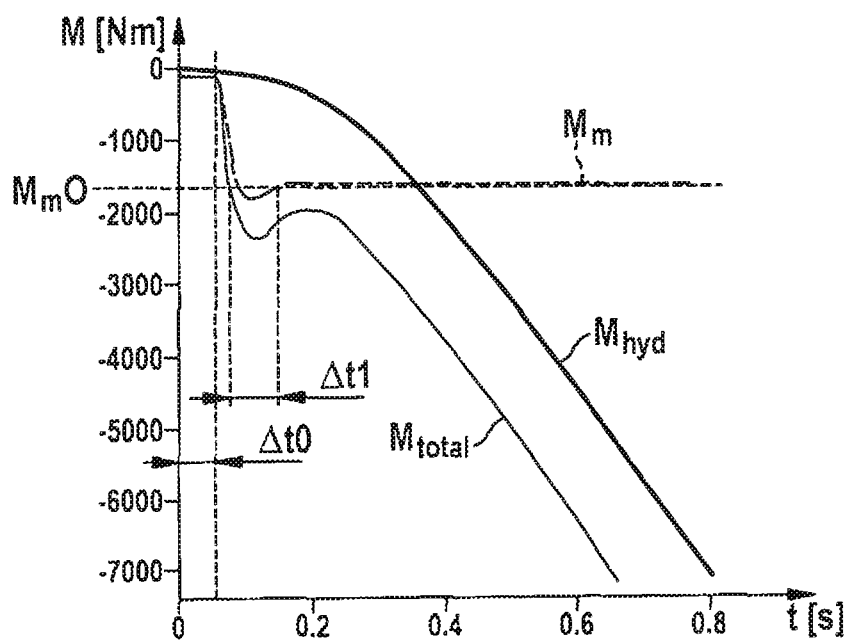
FIG. 2 shows a coordinate system for explaining a first specific embodiment of the method for operating an electric motor for braking a vehicle.

FIG. 2 shows a coordinate system for explaining a first specific embodiment of the example method for operating an electric motor for braking a vehicle. In the coordinate system in FIG. 2, the abscissa is a time axis t (in seconds). The ordinate of the coordinate system in FIG. 2 depicts a wheel braking torque M (as the sum of both wheel braking torques of an axle) in newton meters.

A deceleration of the motor vehicle is requested at a point in time t=0. In the method described here, the electric motor is controlled in such a way that the vehicle is slowed or decelerated (to a standstill) at least with the aid of a motor braking torque Mm exerted by the controlled electric motor on at least one wheel and/or at least one axle of the vehicle. The electric motor which is operated for carrying out the method described here may be, for example, an electric motor that is suitable for generator mode/recuperative braking of the vehicle. Thus, by operating the electric motor for braking the vehicle, a kinetic energy of the vehicle may be converted into electrical energy, which is utilized for charging an energy store/a battery. The method described here may thus be used for reducing fuel consumption and possibly pollutant emissions during travel of the vehicle. In particular, the electric motor may be designed as a drive motor in such a way that it is optionally usable also for accelerating the vehicle. The electric motor may also be an axle drive of the vehicle which is connected to an axle differential and two wheels to be driven (for example, wheels of the front axle). It is additionally pointed out that in one certain specific embodiment of the present invention, the electric motor may also be used in an electromechanical brake booster which is connected upstream from a brake master cylinder of a hydraulic braking system of the vehicle. Likewise, the electric motor may be a motor of a plunger that is used in the hydraulic braking system. In all cases described here, the electric motor has more advantageous dynamics than conventional hydraulic braking systems. In addition, implementation of the method described here is not limited to one of the types of the operated electric motor mentioned here. Furthermore, multiple individual motor units may also be operated as "the electric motor" when carrying out the method described here.

The vehicle/motor vehicle which is slowed/decelerated (to a standstill) with the aid of the particular electric motor is not limited to a certain type of vehicle or motor vehicle. For example, the electric motor may be used in a number of various hybrid or electric vehicles.

It is also pointed out that the method described here is well suited for carrying out autonomous braking, i.e., braking which is requested not by a driver of the vehicle, but, rather, by an autonomous automatic system of the vehicle (an emergency braking system and/or an automatic speed control system, for example). In particular, emergency braking (autonomous emergency braking (AEB)) of the vehicle or braking carried out with the aid of a hydraulic braking assistant (HBA) may be reliably implemented with the aid of the method described here. The method described here may therefore also increase a safety standard of non-driver-controlled autonomous driving of the particular vehicle. For example, in particular all of the types of motors mentioned above are well suited for automatic slowing or deceleration of the vehicle thus equipped, due to their advantageous dynamics.

In the method described here, the electric motor is controlled with regard to a requested setpoint speed change, taking at least one default signal into account. The requested setpoint speed change may be requested by the driver of the vehicle (by actuating a brake actuating element/brake pedal and/or an accelerator pedal) as well as by the autonomous automatic control system of the vehicle. The at least one default signal concerning the requested setpoint speed change may be, for example, at least one signal of a brake actuating element sensor, such as a pedal travel sensor, a rod travel sensor, a differential travel sensor, and/or a driver brake force sensor, an accelerator pedal sensor, and/or the autonomous automatic control system.

When the method described here is carried out, an ascertainment is made, based on the at least one default signal, whether the requested setpoint speed change is in a predefined normal range. The normal range is preferably defined such that only emergency braking is outside the normal range. Thus, taking the at least one default signal into account, it may be ascertained whether the requested setpoint speed change indicates emergency braking.

For example, it may be recognized, based on an actuating speed and/or an actuating acceleration during actuation of the brake actuating element/brake pedal or the accelerator pedal, whether the requested setpoint speed change is in the predefined normal range. In particular, a rapid/sudden interruption in the actuation of the accelerator pedal and/or a rapid/sudden actuation of the brake actuating element/brake pedal may be an indication of a requested setpoint speed change outside the normal range. In addition, a magnitude of the requested setpoint speed change may be an indication that it is outside the predefined normal range. Furthermore, it may be recognizable, for example, that the at least one default signal for the requested setpoint speed change is a signal of an emergency braking system, and therefore the setpoint speed change is outside the normal range. In all cases described here, emergency braking is recognizable as such with a relatively low error rate.

Figure 1:
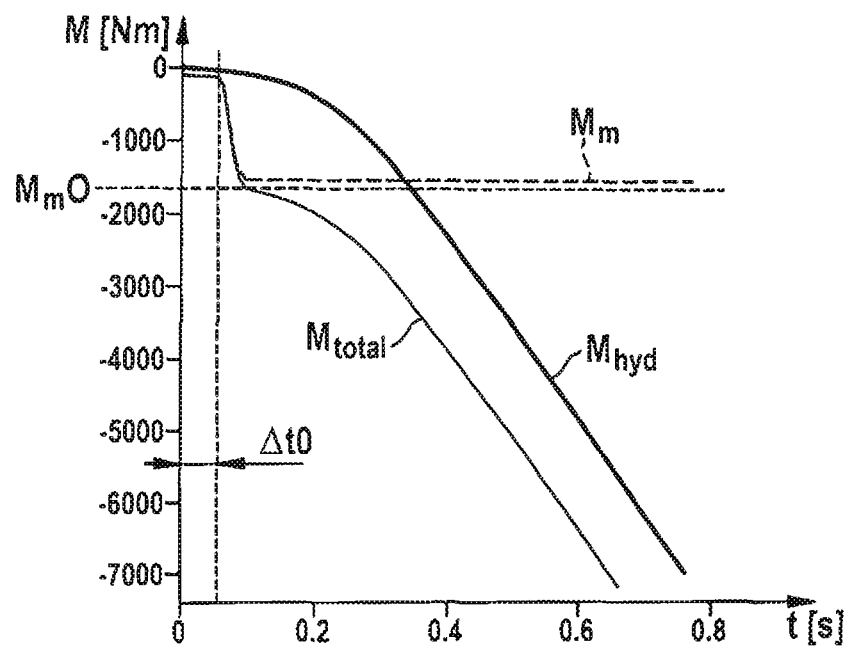
FIG. 1 shows a coordinate system for explaining a conventional method for decelerating a motor vehicle.

If the requested setpoint speed change is in the predefined normal range, in the method described here the electric motor is controlled in such a way that a load to be applied by the electric motor remains less than or equal to a nominal load capacity (a nominal load) of the electric motor. In other words, if the requested setpoint speed change is in the predefined normal range, the electric motor is controlled in such a way that a motor braking torque $Mm$ effectuated by the electric motor (during the overall requested slowing or deceleration of the vehicle) remains less than or equal to a limiting motor braking torque $Mm0$, above which the load on the electric motor exceeds the nominal load capacity. (One example of a pattern of the motor braking torque $Mm$ in a situation in which the requested setpoint speed change is in the predefined normal range is illustrated in the coordinate system in FIG. 1.)

The coordinate system in FIG. 2 shows an example of a situation in which the requested setpoint speed change is outside the predefined normal range. If the requested setpoint speed change is outside the predefined normal range in the method described here, the electric motor is controlled in such a way that the load to be applied by the electric motor exceeds the nominal load capacity of the electric motor, at least during a predefined overload operation time interval $\Delta t1$. Thus, in other words, if the requested setpoint speed change is outside the predefined normal range, the electric motor is controlled in such a way that a motor braking torque $Mm$ effectuated by the electric motor is above limiting motor braking torque $Mm0$, at least during predefined overload operation time interval $\Delta t1$.

Thus, for a setpoint speed change outside the predefined normal range, the electric motor may be operated with full utilization of its resources. As is apparent based on the coordinate system in FIG. 2, the electric motor may already effectuate a motor braking torque $Mm$ above limiting motor braking torque $Mm0$ for braking the vehicle, (virtually) immediately after the request for the setpoint speed change (i.e., after a communication-related reaction time $\Delta t0$ of 60 ms, for example, has elapsed). This may be utilized in a targeted manner for preventing accidents in emergency braking situations, in that a braking distance of the vehicle is shortened by temporarily overloading the electric motor.

The number of setpoint changes in speed to be expected outside the predefined normal range is comparatively small (in particular in relation to the service life of the vehicle). Due to the infrequent operation of the electric motor in its overload operation (at least during the predefined overload operation time interval $\Delta t1$), it is thus possible to achieve a much higher motor braking torque $Mm$ than nominal in a targeted manner in emergency braking situations, without having to accept damage to the electric motor and/or to some other vehicle component.

In the specific embodiment in FIG. 2, in addition to the electric motor, at least one wheel brake cylinder of a hydraulic braking system of the vehicle is also used for slowing/decelerating the vehicle. However, it is generally necessary to initially overcome a clearance of the at least one wheel brake cylinder and to build up a brake pressure in the at least one wheel brake cylinder before the at least one wheel brake cylinder effectuates a friction braking torque $Mhyd$ for slowing/decelerating the vehicle. In other words, the at least one wheel brake cylinder (or the hydraulic braking system equipped with same) has a greatly delayed responsiveness/dynamics compared to the electric motor. However, the electric motor may be utilized for bridging a phase of overcoming the clearance and/or of the brake pressure buildup in the at least one wheel brake cylinder via its overload operation, so that a significant total braking torque $Mtotal$ (made up of motor braking torque $Mm$ and friction braking torque $Mhyd$) may be exerted earlier on the vehicle in order to decelerate it. If the requested setpoint speed change is outside the predefined normal range, the electric motor is therefore preferably controlled in such a way that it operates in overload operation primarily in the phase of overcoming the clearance and/or of the brake pressure buildup. The electric motor is preferably controlled in such a way that it is transferred into its overload operation immediately after recognition that the setpoint speed change is outside the normal range.

In the specific embodiment in FIG. 2 (at least if the requested setpoint speed change is outside the predefined normal range), when the electric motor is controlled, at least one estimated or ascertained variable concerning friction braking torque $Mhyd$ (instantaneously) exerted by the at least one wheel brake cylinder of the hydraulic braking system of the vehicle is advantageously also taken into account. The at least one estimated or ascertained variable may be, for example, the brake pressure present in the at least one wheel brake cylinder, and/or friction braking torque $Mhyd$. The overload operation of the electric motor (or overload operation time interval $\Delta t1$) may in particular be timed in such a way that the electric motor is operated above its nominal load capacity only for bridging the phase of overcoming the clearance and/or of the brake pressure buildup in the at least one wheel brake cylinder. Damage to the electric motor or some other vehicle component is reliably prevented in such short-term utilization of the overload operation of the electric motor.

With the aid of the method depicted in FIG. 2, the braking effect of the electric motor may be used in a targeted manner in such a way that the achieved deceleration of the vehicle is increased with the aid of total braking torque $Mtotal$. The limited dynamics of a hydraulic pressure rise in the at least one wheel brake cylinder is bridged with the aid of the overload operation of the electric motor. At the same time, despite the achieved shortening of the braking distance, it is still ensured that no damage to the electric motor or to some other vehicle component occurs.

Figure 3:
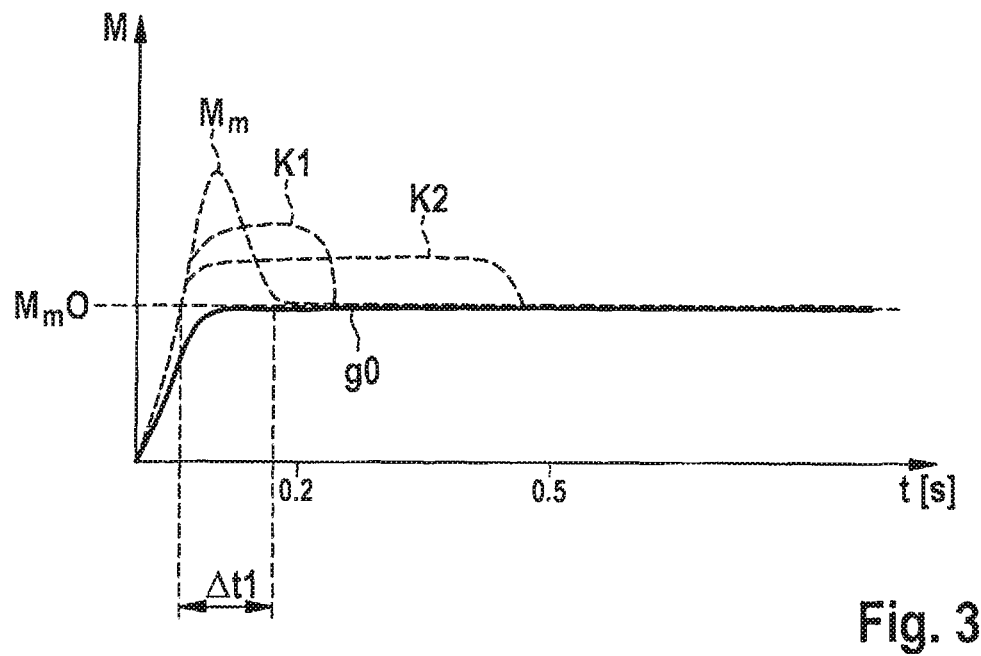
FIG. 3 shows a coordinate system for explaining a second specific embodiment of the method for operating an electric motor for braking a vehicle.

FIG. 3 shows a coordinate system for explaining a second specific embodiment of the method for operating an electric motor for braking a vehicle. In the coordinate system in FIG. 3 as well, the abscissa depicts a time axis t (in seconds), while the ordinate of the coordinate system in FIG. 3 depicts a wheel braking torque M (as the sum of both wheel braking torques of an axle) in newton meters.

As graphically illustrated with the aid of a graph g0, in the method depicted in FIG. 3, if the requested setpoint speed change is in the predefined normal range, the electric motor is controlled in such a way that the load to be applied by the electric motor remains less than or equal to the nominal load capacity of the electric motor. Only if the requested setpoint speed change is outside the predefined normal range is the electric motor controlled, in the method depicted in FIG. 3, in such a way that the load to be applied by the electric motor exceeds the nominal load capacity of the electric motor (graph Mm) (only) during predefined overload operation time interval $\Delta t1$ of 750 milliseconds (ms) maximum. Thus, the method depicted in FIG. 3 also achieves advantageous protection of the electric motor despite its brief operation above the nominal load capacity.

As illustrated with the aid of the graph for motor braking torque Mm, if the requested setpoint speed change is outside the predefined normal range (starting at an end of communication-related reaction time $\Delta t0$), the electric motor is operated in overload operation for overload operation time interval $\Delta t1$. After overload operation time interval $\Delta t1$ has elapsed, the electric motor is controlled in such a way that the load to be applied by the electric motor is regulated in such a way that it is less than or equal to the nominal load capacity of the electric motor. After overload operation time interval $\Delta t1$ has elapsed, motor braking torque Mm effectuated by the electric motor is therefore returned at most to limiting motor braking torque Mm0. The temporary overloading of the electric motor during overload operation time interval $\Delta t1$ may also be referred to as transient overshoot.

Overload operation time interval $\Delta t1$ may be set to be shorter than 500 milliseconds (ms), in particular shorter than 300 milliseconds (ms), and if desired, shorter than 200 milliseconds (ms), even shorter than 100 milliseconds (ms). In one alternative modification of the method in FIG. 3, other curves k1 or k2 may also be predefined for the transient overshoot. Optimal step responses may thus be generated as a profile of motor braking torque Mm, in accordance with the needs of the particular drive train of the electric motor. When optimization is made to the particular dynamic transition behavior, the braking distance of the vehicle may be shortened in all cases due to equal-area compensation. In addition, the method depicted in FIG. 3 thus achieves rapid emergency braking of a vehicle, in particular in an emergency braking situation.

No friction braking torque Mhyd of at least one wheel brake cylinder is plotted in the coordinate system in FIG. 3. However, it is pointed out that the method depicted in FIG. 3 may optionally be refined in such a way that the at least one wheel brake cylinder of the hydraulic braking system is also used for slowing/decelerating the vehicle. Further features/method steps of the specific embodiment in FIG. 2 may also be transferred to the method in FIG. 3.

Figure 4:
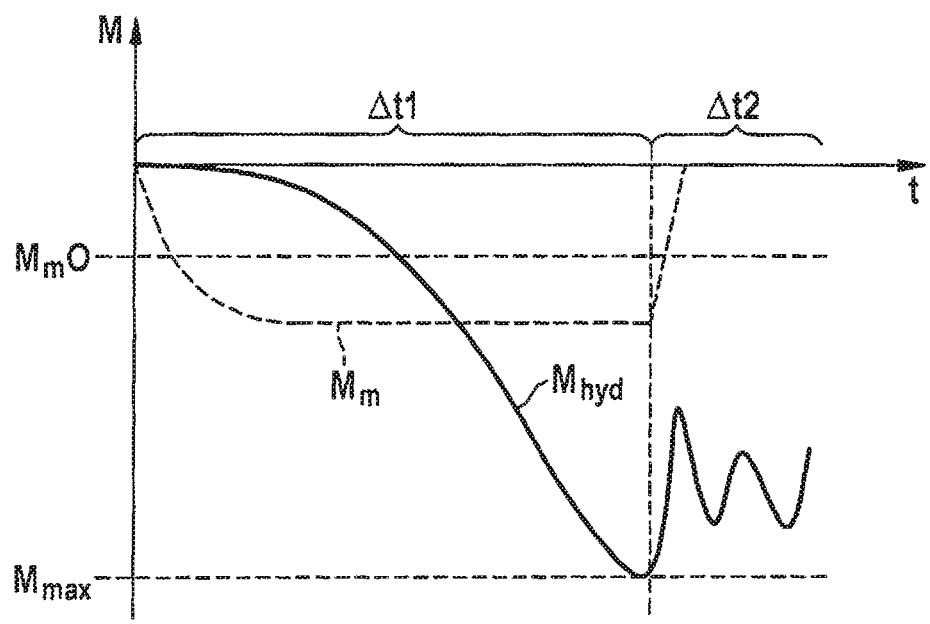
FIG. 4 shows a coordinate system for explaining a third specific embodiment of the method for operating an electric motor for braking a vehicle.

FIG. 4 shows a coordinate system for explaining a third specific embodiment of the method for operating an electric motor for braking a vehicle. With regard to the abscissa and the ordinate of the coordinate system in FIG. 4, reference is made to the preceding figures.

Also in the method in FIG. 4, the electric motor together with the at least one wheel brake cylinder of the hydraulic braking system is utilized for slowing/decelerating the vehicle. In addition, (at least if the requested setpoint speed change is outside the predefined normal range), when the electric motor is controlled the at least one estimated or ascertained variable Mhyd is also taken into account with regard to friction braking torque Mhyd (instantaneously) exerted by the at least one wheel brake cylinder of the hydraulic braking system. In particular, if the requested setpoint speed change is outside the predefined normal range, the load to be applied by the electric motor (after communication-related reaction time $\Delta t0$) is controlled above the nominal load capacity of the electric motor only until estimated or ascertained variable Mhyd exceeds a predefined or set limiting value Mmax, and/or a wheel slip is detected. It may thus be ensured that an antilock braking system (ABS) control possibly to be carried out is not adversely affected by an increased torque of the electric motor.

At the start of an ABS control, the braked wheels therefore do not have excessively high brake slips. Steerability of the vehicle is thus ensured. In addition, a transition of the electric motor from its overload operation into a nominal operation, or a deactivated phase without interfering with/influencing the ABS control, is possible.

As an example, in the method in FIG. 4, measured or estimated friction braking torque Mhyd as estimated or ascertained variable Mhyd is compared to predefined or set limiting value Mmax. However, the (estimated or measured) brake pressure present in the at least one wheel brake cylinder may likewise also be evaluated as estimated or ascertained variable Mhyd. Alternatively or additionally, the load to be applied by the electric motor may also be controlled above the nominal load capacity of the electric motor until a wheel slip threshold is exceeded. The occurrence of wheel slip may be detected at an antilock braking system (ABS) bit, for example.

In the method in FIG. 4, the electric motor, previously operated in its overload operation, is deactivated as soon as estimated or ascertained variable Mhyd exceeds predefined or set limiting value Mmax, and/or a wheel slip is detected. The vehicle is then decelerated (to a standstill) for a residual braking time $\Delta t2$ without using the electric motor. The procedure depicted in FIG. 4 may also be referred to as a bridging of the brake pressure buildup in the at least one wheel brake cylinder with the aid of the overload operation of the electric motor upon immediate turn off/deactivation of the electric motor at the point in time of a wheel block/a wheel slip, an ABS control intervention, and/or reaching predefined or set limiting value Mmax for the at least one variable Mhyd. This has the advantage that the operating point of the ABS controller is (generally) maintained by a ramp-like turn-off of motor braking torque Mm of the electric motor.

Limiting value Mmax for the at least one variable Mhyd (as the wheel brake slip threshold) may be predefined or set in such a way that, beginning when the at least one variable Mhyd is equal to limiting value Mmax, a wheel slip may occur with increased likelihood. For example, limiting value Mmax may be a limiting brake pressure and/or a limiting friction braking torque Mmax, above which the occurrence of a wheel slip is likely.

In one particularly advantageous refinement, the limiting value is set by taking an instantaneous speed of the vehicle, an instantaneous longitudinal acceleration of the vehicle, and/or an instantaneous transverse acceleration of the vehicle into account. All of the advantages described above are achieved in this way.

However, in one alternative specific embodiment, a decrease in motor braking torque Mm of the electric motor may take place so that it matches the hydraulic brake pressure modulation of the ABS system which has just been carried out. In this case, for example, a maximum of most recently determined friction braking torque Mhyd and a sum of individual braking torques M1 and M2 of the wheel brake cylinders of the driven axle is initially determined as instantaneous friction braking torque Mhyd according to Equation 1:

$$Mhyd(k+1)=\max(Mhyd(k); (M1(k)+M2(k))) \quad \text{(Eq. 1)}$$

At the start of an ABS control, a pressure reduction takes place in at least one of the wheel brake cylinders of the driven axle. For this purpose, excess braking torque ΔMhyd may be determined, using a minimum of individual braking torques M1 and M2 of the wheel brake cylinders of the driven axle, according to Equation 2:

$$\Delta Mhyd(k+1)=Mhyd(k+1)-2*\min(M1(k); M2(k)) \quad \text{(Eq. 2)}$$

A setpoint difference ΔMm of motor braking torque Mm of the electric motor is subsequently reduced by the value according to Equation 3:

$$\Delta Mm(k+1)=v*\max(\Delta Mhyd(k+1); \Delta Mhyd(k)), \quad \text{(Eq. 3)}$$

where v is an optional weighting factor (v=0.5 to 1.5, for example).

The ABS system may then individually control individual braking torques M1 and M2 of the wheel brake cylinders of the driven axle in a known manner.

Further features/method steps of the specific embodiment described above may likewise be combined with the method in FIG. 4.

A braking distance until the vehicle is completely decelerated may be easily shortened with the aid of all of the methods described above. All methods are suited for modular use in existing ESP systems which include known ABS control processes. If the methods require friction braking torques Mhyd or the brake pressures in the wheel brake cylinders of the driven wheels, these variables are generally available in the ESP/ABS system. In addition, these variables may be easily measured.

All methods described here are also suitable for AEB braking maneuvers for operating the particular electric motor in generator mode. The output variables and the setpoint values may be transmitted via the vehicle network to an inverter, where they are measurable as achieved values for the torque and the speed of the electric motor. The individual components of the particular active chain of the recuperation system are not operated at their respective absolute load limit during normal operation. This results in a comparatively long service life of the individual components.

In the event of an emergency braking situation (AEB, for example), any of the above-described methods may be utilizable for effectuating an additional braking potential which is usable for a short period of time. For a duration of the exceedance below 500 ms, no problems with the electric motor or the battery are to be expected. Instead, the charge management of the drive battery may take place in such a way that a resulting one-time energy input is possible at any time, at least in the brief phase of the hydraulic brake pressure buildup during an emergency braking situation. If the drive battery is not able to accept the resulting energy during an emergency braking situation, the electric motor, depending on the design, could optionally be operated in the so-called active short circuit (ASC) mode. In this case, the motor braking torque is converted into heat in the electric motor. Since this operating mode is carried out only briefly, there is no concern for thermal overload of the electric motor. Thus, destruction of the electric motor remains precluded.

Figure 5:
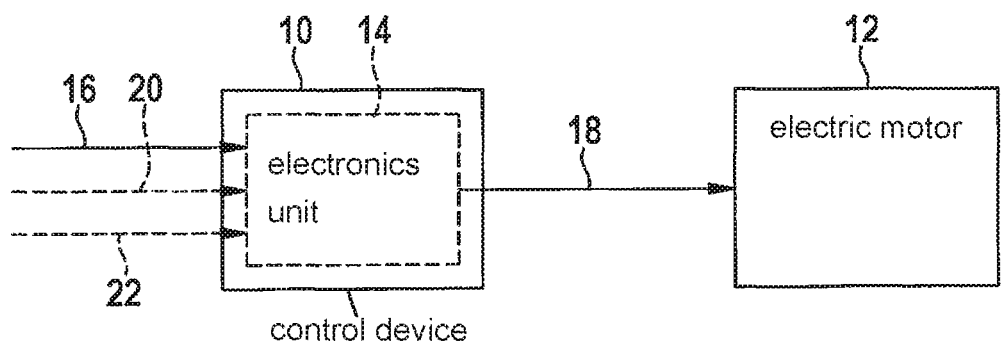
FIG. 5 shows a schematic illustration of one specific embodiment of the control device.

FIG. 5 shows a schematic illustration of one specific embodiment of the control device.

Control device 10 schematically illustrated in FIG. 5, together with an electric motor 12, is usable in a number of various types of braking systems. It is pointed out that a utilization of control device 10 is not limited to a certain type of electric motor 12.

Control device 10 includes an electronics unit 14 which is designed for receiving at least one provided default signal 16 concerning a setpoint speed change requested by a driver of the vehicle or an autonomous automatic control system of the vehicle. Examples of the at least one receivable default signal 16 have already been mentioned above. The electronics unit is also designed for controlling electric motor 12 with the aid of at least one control signal 18, taking into account the at least one provided default signal 16, in such a way that a motor braking torque is exertable on at least one wheel and/or at least one axle of the vehicle with the aid of controlled electric motor 12. The vehicle may thus be slowed or decelerated at least with the aid of the motor braking torque of electric motor 12.

It is expressly pointed out here that electronics unit 14 is additionally designed for recognizing whether the requested setpoint speed change is in a predefined normal range, taking the at least one default signal 16 into account. If the requested setpoint speed change is in the predefined normal range, electric motor 12 is controllable by electronics unit 14 in such a way that a load to be applied by electric motor 12 remains less than or equal to a nominal load capacity of electric motor 12. In contrast, if the requested setpoint speed change is outside the predefined normal range, electronics unit 14 is designed for controlling electric motor 12 in such a way that the load to be applied by electric motor 12 exceeds the nominal load capacity of electric motor 12, at least during a predefined overload operation time interval.

Thus, control device 10 also provides all of the advantages described above.

For example, if the requested setpoint speed change is outside the predefined normal range, electronics unit 14 may additionally be designed for controlling electric motor 12 in such a way that the load to be applied by electric motor 12 exceeds the nominal load capacity of electric motor 12 during the predefined (set) overload operation time interval of 750 ms maximum. In the specific embodiment in FIG. 5, at least if the requested setpoint speed change is outside the predefined normal range, electronics unit 14 is designed for also taking into account at least one provided or self-determined variable 20 concerning a friction braking torque instantaneously exerted by at least one wheel brake cylinder of a hydraulic braking system of the vehicle, during control of electric motor 12. If the requested setpoint speed change is outside the predefined normal range, electronics unit 14 may also be designed for controlling electric motor 12 in such a way that the load to be applied by electric motor 12 is above the nominal load capacity of electric motor 12 only until the provided or self-determined variable 20 exceeds a predefined or set limiting value, and/or a wheel slip signal 22 regarding a wheel slip that is instantaneously present is received by electronics unit 14. Wheel slip signal 22 may be an antilock braking system (ABS) bit, for example. The limiting value for the at least one variable 20, may (as the wheel brake slip threshold) be predefined or set in such a way that, beginning when the at least one variable 20 is equal to the limiting value, a wheel slip may occur (with increased likelihood). The limiting value may be set, (in particular by electronics unit 14), taking an instantaneous speed of the vehicle, an instantaneous longitudinal acceleration of the vehicle, and/or an instantaneous transverse acceleration of the vehicle into account.

An electric motor 12 which is designed at least for braking a vehicle and which includes such a control device 10, as well as a braking system for a vehicle which includes such a control device 10, also provide all the advantages mentioned above.

What is claimed is:

1. A method for operating an electric motor for braking a vehicle, comprising:
    controlling the electric motor in such a way that the vehicle is slowed or decelerated at least with the aid of a motor braking torque exerted by the controlled electric motor on at least one of: i) at least one wheel, and ii) at least one axle of the vehicle, the electric motor being controlled with regard to a setpoint speed change requested by one of a driver of the vehicle or an autonomous automatic control system of the vehicle, taking at least one default signal into account;
    ascertaining whether the requested setpoint speed change is in a predefined normal range, taking the at least one default signal into account;
    if the requested setpoint speed change is in the predefined normal range, controlling the electric motor in such a way that a load to be applied by the electric motor remains less than or equal to a nominal load capacity of the electric motor; and
    if the requested setpoint speed change is outside the predefined normal range, controlling the electric motor in such a way that a load to be applied by the electric motor exceeds the nominal load capacity of the electric motor, at least during a predefined overload operation time interval.

2. The method as recited in claim 1, wherein if the requested setpoint speed change is outside the predefined normal range, the electric motor is controlled in such a way that the load to be applied by the electric motor exceeds the nominal load capacity of the electric motor during the predefined overload operation time interval of 750 ms maximum.

3. The method as recited in claim 1, wherein, if the requested setpoint speed change is outside the predefined normal range, at least one estimated or ascertained variable concerning a friction braking torque instantaneously exerted by at least one wheel brake cylinder of a hydraulic braking system of the vehicle is also taken into account during the control of the electric motor.

4. The method as recited in claim 1, wherein if the requested setpoint speed change is outside the predefined normal range, the load to be applied by the electric motor is controlled above the nominal load capacity of the electric motor only until at least one of: i) the estimated or ascertained variable exceeds a predefined or set limiting value, and ii) a wheel slip is detected.

5. The method as recited in claim 4, wherein the limiting value is set taking into account at least one of: i) an instantaneous speed of the vehicle, ii) an instantaneous longitudinal acceleration of the vehicle, and iii) an instantaneous transverse acceleration of the vehicle.

6. A control device for an electric motor which is designed at least for braking a vehicle, the control device comprising:
    an electronics unit which is designed for controlling the electric motor, taking into account at least one provided default signal concerning a setpoint speed change requested by a driver of the vehicle or an autonomous automatic control system of the vehicle, in such a way that a motor braking torque is exertable on at least one of: i) at least one wheel of the vehicle, and ii) at least one axle of the vehicle, with the aid of the controlled electric motor, so that the vehicle may be slowed/decelerated at least with the aid of the motor braking torque of the electric motor;
    wherein the electronics unit is additionally designed to: i) recognize whether the requested setpoint speed change is in a predefined normal range, taking the at least one default signal into account, ii) control the electric motor in such a way that a load to be applied by the electric motor remains less than or equal to a nominal load capacity of the electric motor, if the requested setpoint speed change is in the predefined normal range, and iii) control the electric motor in such a way that the load to be applied by the electric motor exceeds the nominal load capacity of the electric motor, at least during a predefined overload operation time interval, if the requested setpoint speed change is outside the predefined normal range.

7. The control device as recited in claim 6, wherein the electronics unit is additionally designed for controlling the electric motor in such a way that the load to be applied by the electric motor exceeds the nominal load capacity of the electric motor during the predefined overload operation time interval of 750 ms maximum, if the requested setpoint speed change is outside the predefined normal range.

8. The control device as recited in claim 7, wherein the electronics unit is designed for also taking into account at least one provided or self-determined variable concerning a friction braking torque instantaneously exerted by at least one wheel brake cylinder of a hydraulic braking system of the vehicle, during control of the electric motor, at least if the requested setpoint speed change is outside the predefined normal range.

9. The control device as recited in claim 8, wherein the electronics unit is additionally designed for controlling the electric motor in such a way that the load to be applied by the electric motor is above the nominal load capacity of the electric motor only until at least one of: i) the provided or self-determined variable exceeds a predefined or set limiting value, and ii) a wheel slip signal regarding a wheel slip that is instantaneously present is received by the electronics unit, if the requested setpoint speed change is outside the predefined normal range.

10. The control device as recited in claim 9, wherein the electronics unit is additionally designed for setting the limiting value, taking into account at least one of: i) an instantaneous speed of the vehicle, ii) an instantaneous longitudinal acceleration of the vehicle, and iii) an instantaneous transverse acceleration of the vehicle.

11. An electric motor which is designed at least for braking a vehicle, the electric motor including a control device comprising:
    an electronics unit which is designed for controlling the electric motor, taking into account at least one provided default signal concerning a setpoint speed change requested by a driver of the vehicle or an autonomous automatic control system of the vehicle, in such a way that a motor braking torque is exertable on at least one of: i) at least one wheel of the vehicle, and ii) at least one axle of the vehicle, with the aid of the controlled electric motor, so that the vehicle may be slowed/decelerated at least with the aid of the motor braking torque of the electric motor;
wherein the electronics unit is additionally designed to: i) recognize whether the requested setpoint speed change is in a predefined normal range, taking the at least one default signal into account, ii) control the electric motor in such a way that a load to be applied by the electric motor remains less than or equal to a nominal load capacity of the electric motor, if the requested setpoint speed change is in the predefined normal range, and iii) control the electric motor in such a way that the load to be applied by the electric motor exceeds the nominal load capacity of the electric motor, at least during a predefined overload operation time interval, if the requested setpoint speed change is outside the predefined normal range.

12. A braking system for a vehicle, the braking system including a control device, the control device comprising:
an electronics unit which is designed for controlling the electric motor, taking into account at least one provided default signal concerning a setpoint speed change requested by a driver of the vehicle or an autonomous automatic control system of the vehicle, in such a way that a motor braking torque is exertable on at least one of: i) at least one wheel of the vehicle, and ii) at least one axle of the vehicle, with the aid of the controlled electric motor, so that the vehicle may be slowed/decelerated at least with the aid of the motor braking torque of the electric motor;
wherein the electronics unit is additionally designed to: i) recognize whether the requested setpoint speed change is in a predefined normal range, taking the at least one default signal into account, ii) control the electric motor in such a way that a load to be applied by the electric motor remains less than or equal to a nominal load capacity of the electric motor, if the requested setpoint speed change is in the predefined normal range, and iii) control the electric motor in such a way that the load to be applied by the electric motor exceeds the nominal load capacity of the electric motor, at least during a predefined overload operation time interval, if the requested setpoint speed change is outside the predefined normal range.

* * * * *